United States Patent [19]
Wakabayashi

[11] Patent Number: 5,548,359
[45] Date of Patent: Aug. 20, 1996

[54] CAMERA EQUIPPED WITH BAR CODE READING DEVICE

[75] Inventor: Tsutomu Wakabayashi, Yokohama, Japan

[73] Assignee: Nikon Corporation, Tokyo, Japan

[21] Appl. No.: 376,444

[22] Filed: Jan. 23, 1995

Related U.S. Application Data

[63] Continuation of Ser. No. 277,293, Jul. 21, 1994, abandoned, which is a continuation of Ser. No. 166,914, Dec. 15, 1993, abandoned, which is a continuation of Ser. No. 92,482, Jul. 16, 1993, abandoned.

[30] Foreign Application Priority Data

Jul. 20, 1992 [JP] Japan .................................... 4-192129

[51] Int. Cl.⁶ .............................. G03B 7/00; G03B 1/18
[52] U.S. Cl. ........................................... 354/21; 354/173.1
[58] Field of Search .................................... 354/21, 173.1, 354/173.11, 275

[56] References Cited

U.S. PATENT DOCUMENTS

| | | | |
|---|---|---|---|
| 4,832,275 | 5/1989 | Robertson | 354/275 |
| 4,918,474 | 4/1990 | Kawamura et al. | 354/173.1 |
| 5,023,642 | 6/1991 | Pagano | 354/275 |
| 5,032,854 | 7/1991 | Smart et al. | 354/21 |
| 5,089,833 | 2/1992 | Takahashi et al. | 354/105 |
| 5,136,314 | 8/1992 | Kazami et al. | 354/173.1 |
| 5,166,715 | 11/1992 | Labaziewicz | 354/173.1 |
| 5,221,940 | 6/1993 | Daitoku et al. | 354/173.1 |

FOREIGN PATENT DOCUMENTS 5-165087  6/1993  Japan .

*Primary Examiner*—Michael L. Gellner
*Assistant Examiner*—Nicholas J. Tuccillo
*Attorney, Agent, or Firm*—Oliff & Berridge

[57] ABSTRACT

The camera of the present invention is adapted to use a cartridge of a type in which when a film spool rotates in the forward direction to push the film out from the cartridge and in the backward direction to rewind the film into the cartridge. The cartridge is equipped with a bar code rotating as a whole with the film spool. The camera comprises a photoelectric reading device reading out the bar code and output the bar code signal, a decoder deciphering the bar code signal, and a microcomputer controling the circuit or the device so as to read out the bar code during film forward process, to decipher the bar code signal thus read out, to judege as to whether decipherment proves impossible to decipher the bar code signal, and to rewind the film when decipherment proves impossible to decipher the bar code signal.

25 Claims, 7 Drawing Sheets

CAMERA EQUIPPED WITH BAR CODE READING DEVICE

This is a Continuation of application Ser. No. 08/277,293 filed Jul. 21, 1994, know abandoned, which in turn is a Contiuntaion of application Ser. No. 08/166,914 filed Dec. 15, 1993, now abandoned, which in turn is a Continuation of application Ser. No. 08/092,482 filed Jul. 16, 1993, now abandoned.

BACKGROUND OF THE INVENTION

1. Field of the Invention

The present invention relates to a camera which is equipped with a device which reads information from a bar code provided on a film cartridge which is loaded into the camera; and more particularly relates to a camera in which countermeasures are provided against the possibility that the bar code signal should be undecipherable.

2. Related Background Art

A film cartridge is per se known (for example, refer to U.S. Pat. No. 4,832,275) of a type in which the film is wound outwards from the cartridge or is rewound into the cartridge, respectively by the axis of a spool provided within the cartridge, on which the film is wound up, being rotated in a forward rotational direction or being rotated in a backward rotational direction. When this type of film cartridge is loaded into a camera, a film forwarding device within the camera performs the film auto loading process by rotating the axis of the spool within the cartridge in the forward rotational direction so as to wind the head end or leading end of the film outwards from the cartridge in a pushing fashion, until the film leading end is caught by a takeup spool so as to cause the film to start to be wound up on the takeup spool.

In U.S. Pat. No. 5,023,642 there is, per se, disclosed a film cartridge provided with a bar code disk which rotates as a whole together with the aforementioned film spool, and on which there is inscribed in bar code form information relating to the film, such as the ISO sensitivity of the film and the number of frames available on the film. With a camera using this sort of film cartridge, during the operation of film auto loading, the bar code is read by a photoelectric reading device which produces a signal representative thereof. Subsequently it is necessary to decipher the bar code signal produced by this photoelectric device, in order to obtain the above described information relating to the film.

However, it is not guaranteed that the film spool axis of this type of film cartridge is always rotated at an identical speed during the operation of film auto loading. If for any reason an unevenness or irregularity should occur in the rotation of the film spool, i.e. in the rotational speed of the bar code disk, then there is a danger that it may not be possible to decipher the bar code signal read out by the photoelectric reading device from the bar code disk, so that accurate information relating to the film cannot be obtained. Moreover, in the teaching of the above identified U.S. Pat. No. 5,023,642 there is no suggestion as to what should be done in the event that the bar code signal should prove to be undecipherable, and because of this there is a danger that photography may subsequently proceed in an undesirable fashion without having obtained accurate information relating to the film, so that undesirable results may occur—for example over or under exposure of photographs taken on the film, mistaken frame counting, etc.

SUMMARY OF THE INVENTION

The object of the present invention is to provide a camera equipped with a control system which, when during the operation of film auto loading the information in the above described bar code signal proves impossible to decipher, prevents photography subsequently proceeding in an undesirable fashion.

The present invention is applied to a camera receiving a film cartridge from which a film is pushed out when a film spool rotates in a forward rotational direction and into which the film is rewound when the film spool rotates in a backward rotational direction, and which comprises a bar code bearing element rotating together with said film spool.

The above-noted object is accomplished by the camera comprising: (a) a film spool rotating means which by rotating said film spool in a forward rotational direction projects the leading end of said film out from said film cartridge towards and against a film take up spool, and also, by rotating said film spool in a backward rotational direction, winds said film back into said film cartridge; (b) a film winding on means which winds on said film by rotating said film take up spool in a forward rotational direction; (c) a bar code reading out means which, when said film spool of said film cartridge is rotating, reads the pattern of a bar code which is provided on said bar code bearing element and outputs a bar code signal; (d) a deciphering means which deciphers and outputs said bar code signal from said bar code reading out means; and: (e) a control means which controls said film spool rotating means, said bar code reading out means, and said deciphering means so as: (e1) to read out said bar code pattern while feeding said film; (e2) to attempt to decipher said read out bar code signal; (e3) to decide whether or not decipherment of said read out bar code signal proved possible; and: (e4) if a decision is made that decipherment of said read out bar code signal did not prove possible, to rewind said film into said film cartridge by rotating said film spool in said backward rotational direction.

Thus, according to the present invention, the film is rewound when it has proved impossible to decipher the read out bar code signal which was read out during forwarding of the film. Accordingly it is positively prevented that photography should undesirably take place without the bar code information having been properly read out from the film cartridge.

If the auto loading process is performed by projecting the leading end of the film out from the film cartridge by rotating the film spool of said film cartridge, when a cartridge is loaded into the camera, it is desirable for the bar code pattern to be read out during this auto loading process.

Further, it is desirable, when it has proved impossible to decipher the bar code signal which was read out from the film cartridge during forwarding of the film, for the bar code pattern to be read out for a second time during the above described subsequent rewinding of the film, and for another attempt to be made at deciphering this bar code pattern.

If as before during this rewinding of the film it proves impossible to decipher the bar code signal which was read out from the film cartridge, then, it is desirable, after the film has been completely rewound into the film cartridge, to further rotate the film spool in the backward rotational direction, and simultaneously to make further attempts to read out the bar code pattern and to decipher it.

According to this kind of construction for a camera according to the present invention, even when the information relating to the film is not satisfactorily obtained while initially projecting the leading end of the film out from the film cartridge, the chance of subsequently accurately obtaining said film related information is greatly enhanced.

If the bar code information has been deciphered while rewinding the film or subsequently, i.e. while rotating the film spool of the film cartridge in the backward rotational direction, it is desirable subsequently to perform the film auto loading process for a second time. According to this particular specialization of the present invention, it is possible subsequently to perform photography with the information relating to the film having been satisfactorily read out and deciphered.

When the film has been rewound due to it having proved impossible to decipher the bar code signal which has been read out during the film auto loading process, it is desirable, after the film has been completely rewound, to perform the auto loading process for a second time, and simultaneously therewith to read out the bar code pattern for a second time and subsequently to decipher it.

According to a camera with the above described alternative construction, the chance of subsequently accurately obtaining said film related information is greatly enhanced. With this variation, in second and subsequent attempts to decipher the bar code signal, it is not necessary to apply any different decoding process from that applied initially, because the bar code pattern is being read out in the same direction as before.

It is also desirable, even if during the film auto loading process it has proved impossible to decipher the bar code signal, for further attempts to be made to read out the bar code pattern and to decipher the bar code signal simultaneously with this further winding on of the film. By doing this it is possible to minimize the number of times the auto loading process is performed for the one film, and accordingly it is possible to avoid the possibility of problems due to a failure of the auto loading process.

When it has proved possible to decipher the bar code signal which was read out from the film cartridge during forwarding of the film, it is also desirable to rewind the film back to a position in which a predetermined portion thereof for a first film frame is positioned in an appropriate position for photography, i.e. is opposed to an aperture of the camera. According to such a camera, it is possible immediately to commence photography when after loading the film cartridge into the camera the bar code has been satisfactorily read out.

It is also possible to display the bar code information which has been read out successfully to the user of the camera, so that he or she can verify that the information is indeed correct. Also it is possible to give a warning to the user of the camera if the bar code information has not been read out successfully, so that he or she can be apprised that there exists a problem in reading out the bar code information.

DETAILED DESCRIPTION OF THE PREFERRED EMBODIMENT

Preferred Embodiment 1

Figure 1:
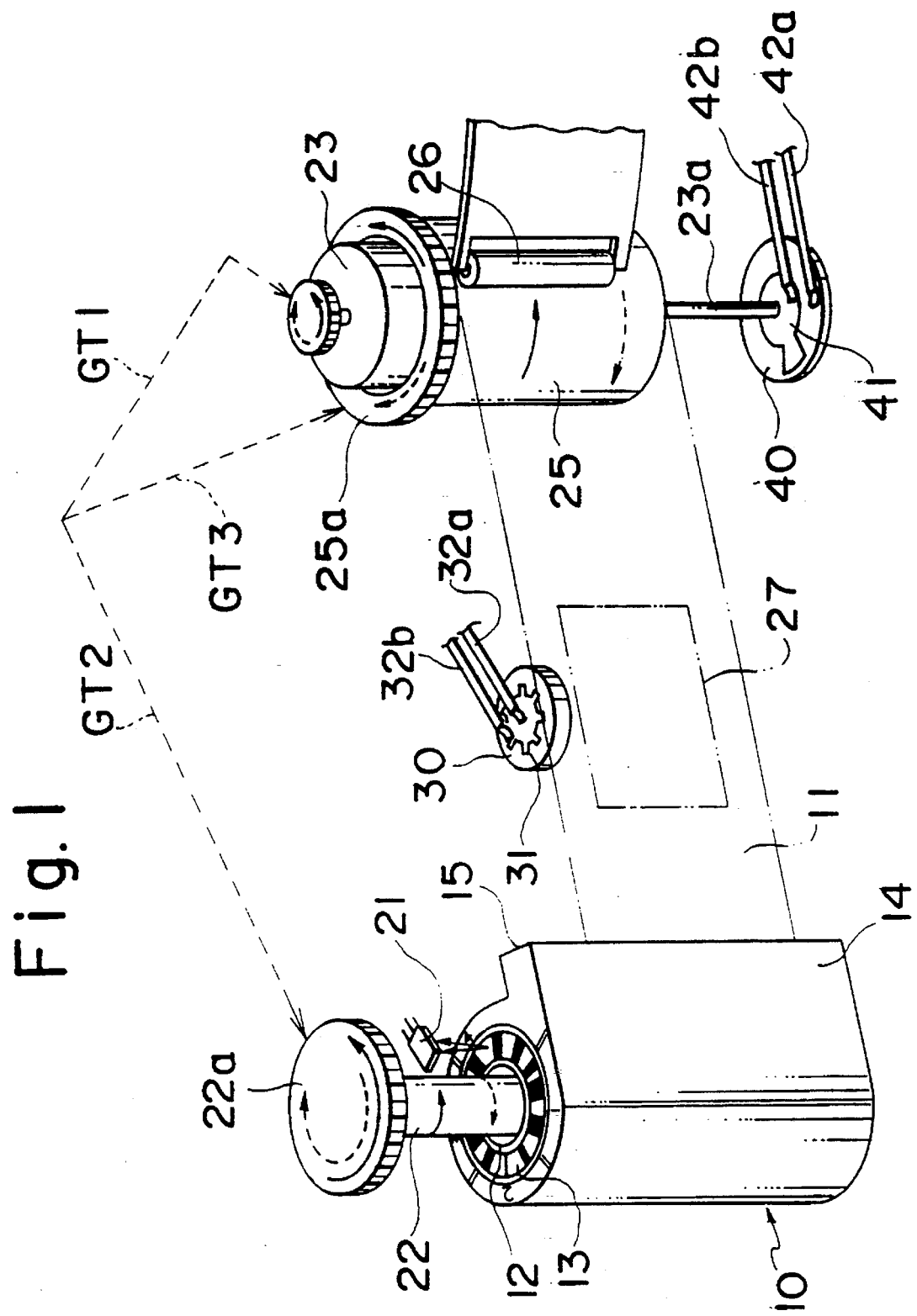
FIG. 1 is a perspective view showing the construction of a film forwarding device incorporated in a camera which is the first preferred embodiment of the present invention.
Figure 2:
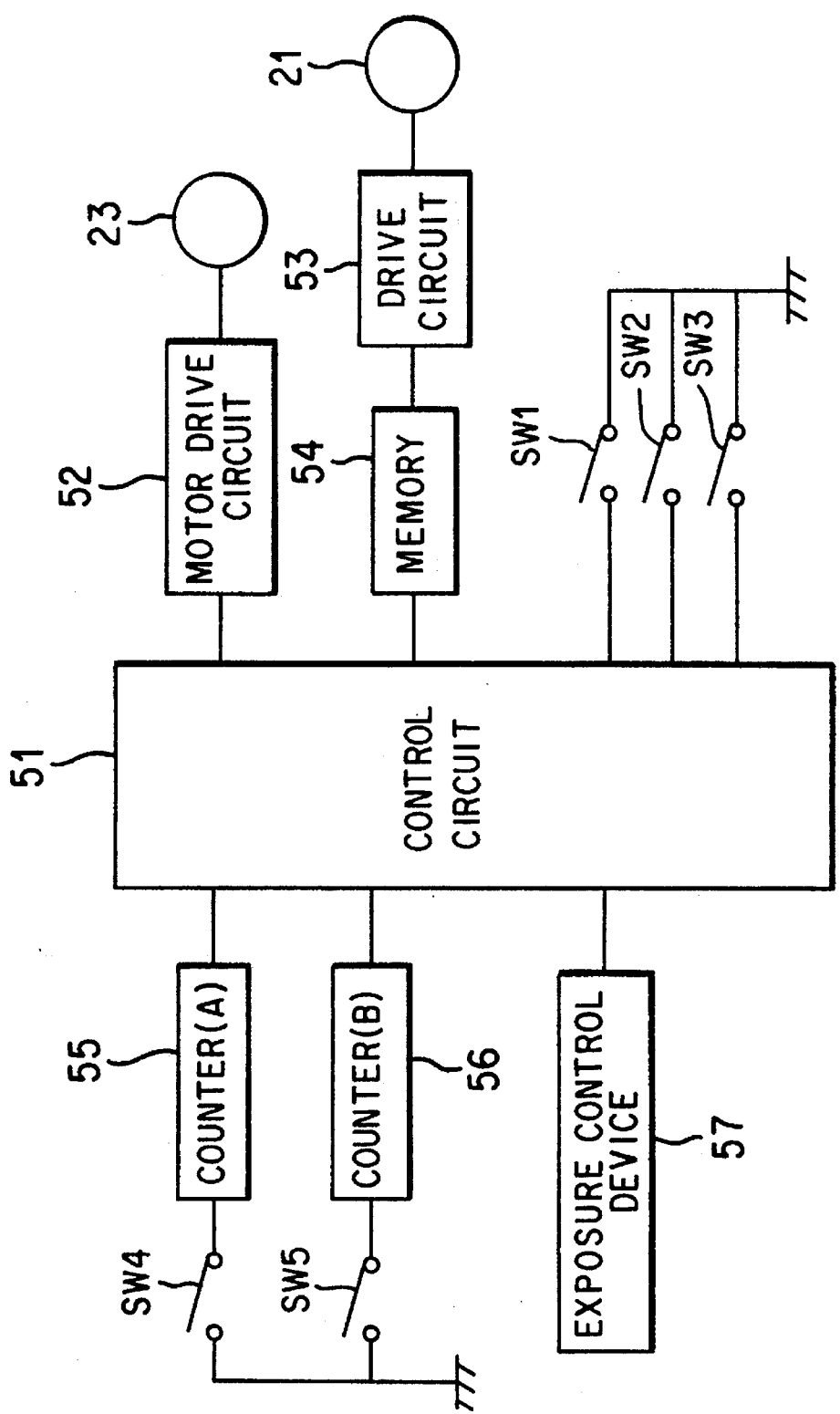
FIG. 2 is a block diagram of a control system for said first preferred embodiment camera equipped with the film forwarding device of FIG. 1.
Figure 3:
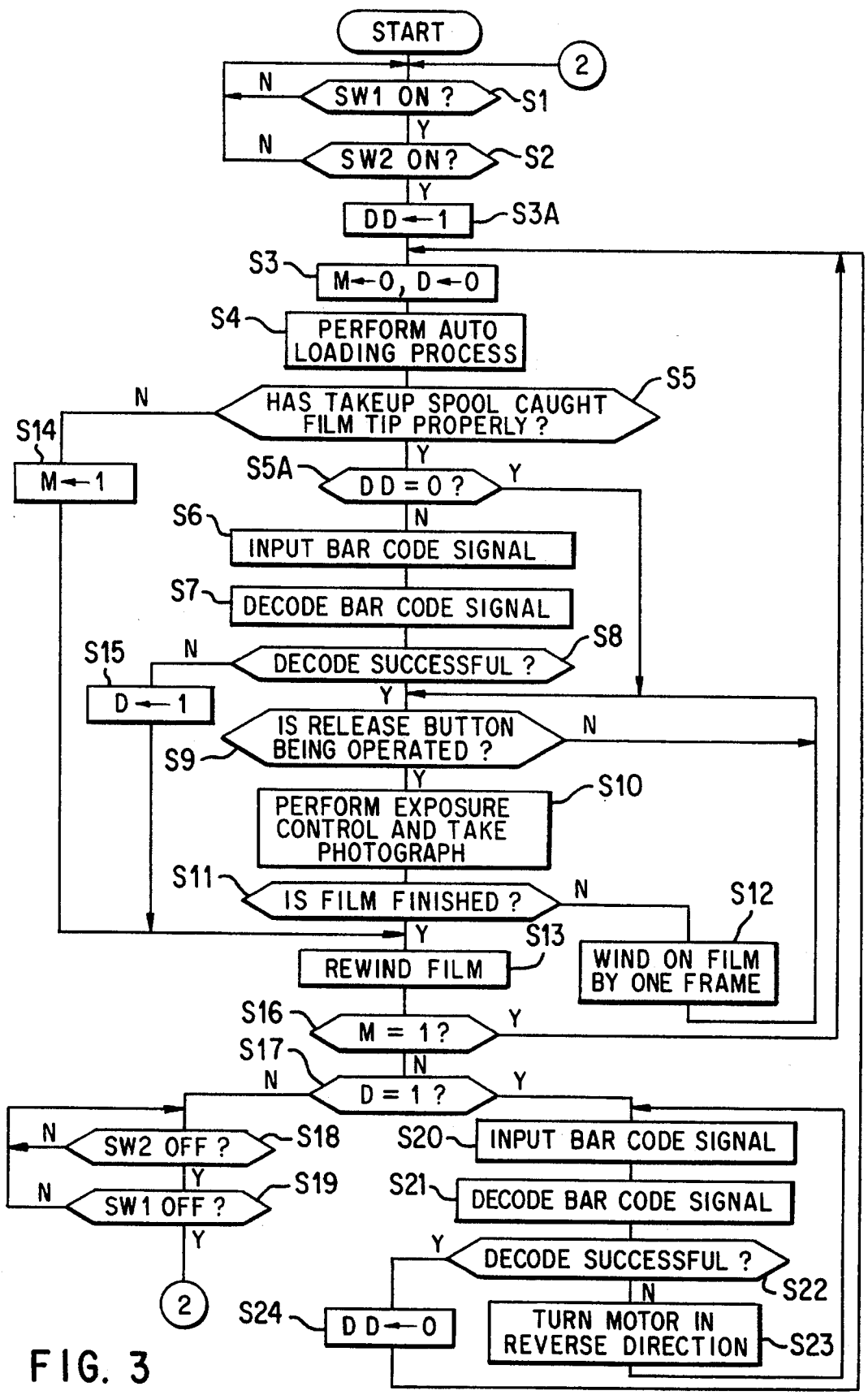
FIG. 3 is a flow chart for explanation of the operation of said camera according to the first preferred embodiment.

FIGS. 1 through 3 illustrate the first preferred embodiment of the present invention.

FIG. 1 shows a perspective view of a film cartridge, not itself included in the present invention, and of portions of a film forwarding device included in a camera which is the first preferred embodiment of the present invention. The reference numeral 10 denotes the film cartridge, which may for example be of the type disclosed in the previously identified U.S. Pat. No. 4,832,275, and this film cartridge 10 comprises: a film cartridge casing 14 which surrounds a generally cylindrical film receiving chamber not shown in the figure and not denoted by any reference numeral; a film spool 12 substantially received within the film receiving chamber defined within the film cartridge casing 14 and extending along it and to which the tail end or trailing end of a film 11 is fixed and around which the film 11 is wound; and a film passage slit 15, formed along the edge of a projecting portion of the film cartridge 10 which extends parallel to the longitudinal axis of the film cartridge 10, the opening of the film passage slit 15 pointing in a tangential direction to the film cartridge 10 so as to deliver the leading end of the film 11 out in the tangential direction. When the film cartridge 10 is new from the manufacturer and has not yet been inserted into any camera, the film 11 thereof is in the state of being entirely wound around the film spool 12, so that the film 11, including its leading end portion, is received entirely within the film cartridge casing 14.

However, as will be explained in more detail hereinafter, when the film cartridge 10 is inserted into a camera, the film spool 12 is rotated by the film forwarding device of FIG. 1 in the forward rotational direction which is the rotational direction to unwind the film 11 from the film spool 12, and thereby the leading end portion of the film 11 is unwound from the film spool 12 and pushes out through the film passage slit 15 so as to reach the outside, progressively to be followed by more and more of the film 11 as the film spool 12 is progressively rotated in the forward rotational direction. On the other hand, when subsequently the film spool 12 is rotated by the film forwarding device of FIG. 1 in the backward rotational direction which is the rotational direction to wind the film 11 onto the film spool 12, then the film 11 is progressively wound back into the film cartridge 10 through the film passage slit 15 as the film spool 12 is progressively rotated, until finally the leading end portion of the film 11 is pulled back through the film passage slit 15, and disappears within the film cartridge casing 14, at which point the film 11 is back in the state of being entirely wound around the film spool 12 and is again received entirely within the film cartridge casing 14.

Further, this film cartridge 10 is similar to that disclosed in the previously identified U.S. Pat. No. 5,023,642, and comprises a bar code disk member 13 formed as a unitary body with its aforementioned film spool 12. Information related to the film, such as for example the ISO sensitivity of the film and the number of frames available on the film, is written on the bar code disk member 13 in bar code pattern form.

In the camera, on the other hand, there is provided a photoreflective detector 21 which reads the bar code pattern on the bar code disk member 13 of the film spool 12 of the film cartridge 10 as the bar code disk member 13 and the film spool 12 rotate together. This photoreflective detector 21 reads in the entire bar code pattern from a fixed starting position thereof during one rotation of the bar code disk member 13 and the film spool 12, and, after temporarily storing the entire read in bar code pattern in a memory 54 shown in FIG. 2, decodes (i.e., deciphers) the bar code pattern in a control circuit 51 also shown in that figure.

In the following, the film forwarding device included in this first preferred embodiment of the camera of the present invention will be described.

As a film take up spool. 25 provided within the main body of the camera rotates in a forward rotational direction as shown by the solid rotational arrow in the figure, it catches the leading end of the film 11, and subsequently the film 11 is wound out of the film cartridge 10 and onto the film take up spool 25 as the film take up spool 25 rotates further in the forward rotational direction. A film take up spool drive gear wheel 25a is integrally provided at the upper end in the figures of the film take up spool 25, and this drive gear wheel 25a is driven in a forward rotational direction by a per se known mechanism not shown in the figure when it is required thus to rotate the film take up spool 25 in its forward rotational direction to catch or to wind on the film 11. The reference numeral 26 denotes a pressure roller which extends parallel to the axis of the film take up spool 25 and which presses against its surface with a determinate pressure, and which thereby aids in guiding the film out from the film cartridge 10. And the reference numeral 22a denotes a film cartridge spool drive gear wheel which is provided with a film cartridge spool drive member 22 which, when the film cartridge 10 is loaded into this camera, engages with the film spool 12 of the film cartridge 10 so as to rotationally drive it. When so required, this film cartridge spool drive gear wheel 22a is rotationally driven by a per se known mechanism not shown in the figure either in a forward rotational direction as shown by the solid rotational arrow in the figure or in a backward rotational direction as shown by the dotted rotational arrow in the figure, so as to rotate the film spool 12 of the film cartridge 10 either in its forward rotational direction or in its backward rotational direction respectively, whereby the film 11 is wound respectively either out of or into the film cartridge 10 as explained above.

This film forwarding device performs three types of operation. First, when a film cartridge 10 is loaded into the camera, it performs the so called auto loading process, in which the leading end of the film 11 is pushed out through the film passage slit 15 until the leading end of the film 11 reaches and is caught by the film take up spool 25 so that the film 11 starts to be wound up thereon. Second, when the film has been properly loaded into the camera, the film forwarding device performs the operation of winding on the film to the next film frame, each time a photograph is taken, by rotating the take up spool 25 further in the forward rotational direction. Third, when all the frames on the film have been shot, the film forwarding device performs the operation of rewinding the film back to its original state so that it is taken completely back into the film cartridge 10 again, by rotating the film spool 12 in the backward rotational direction.

In this first preferred embodiment of the present invention, an electric motor 23 is provided as housed within the film take up spool 25, and is a source of motive rotational power for these three operations of the film forwarding device.

The dashed line in FIG. 1 denoted by the reference symbol GT1 represents a first gear train which receives rotational power from this electric motor 23, the dashed line denoted by the reference symbol GT2 represents a second gear train which supplies rotational power from the first gear train GT1 to the film cartridge spool drive gear wheel 22a, and the dashed line denoted by the reference symbol GT3 represents a third gear train which supplies rotational power from the first gear train GT1 to the drive gear wheel 25a for the film take up spool 25. The details of these gear trains are not shown in the figure because they are not directly relevant to the present invention. They may for example be as disclosed in U.S. Pat. No. 5,136,314 or as disclosed in Japanese Patent application No. Heisei 3-330868.

When the film cartridge 10 is loaded into this camera, its film spool 12 is engaged with the film cartridge spool drive member 22. When the motor 23 is rotated in the forward rotational direction, this rotation is transferred via the first gear train GT1 and the second gear train GT2 to the film cartridge spool drive gear wheel 22a in a manner to rotate it in the forward rotational direction, and is also transferred via the first gear train GT1 and the third gear train GT3 to the drive gear wheel 25a also in a manner to rotate it in the forward rotational direction. Thereby the film cartridge spool drive member 22 and the film take up spool 25 are both rotated in the forward rotational direction. The rotation of the film cartridge spool drive member 22 likewise drives the film spool 12 of the film cartridge 10 in the forward rotational direction, whereby the leading end of the film 11 is pushed out through the film passage slit 15 of the film cartridge 10 so as to reach the outside. Subsequently, the leading end of the film 11 is further pushed in the same manner along past an aperture 27 of the camera until it reaches and is caught by the film take up spool 25. Thereafter the film feeding is performed by only rotating the take up spool 25.

In this preferred embodiment, the reduction ratios provided by the second and third gear trains GT2 and GT3 are set so that the rotational speed of the film take up spool 25 on the film pulling side is about three times as great as the rotational speed of the film spool 12 on the film pushing side, and thereby, when the leading end of the film 11 has reached and been caught by the film take up spool 25, the forwarding speed for the film will be substantially increased rather than as was the case before by the pushing action of the rotating film spool 12.

The rotational speed of the film cartridge spool drive gear wheel 22a is forced to be higher than before by the film being forcibly pulled by the film take up spool 25, the second gear train GT2 is being driven by the film cartridge spool drive gear wheel 22a. However, a one way clutch not particularly shown in the figure is provided between the second gear train GT2 and the first gear train GT1, and as a result this one way clutch overruns at this time, so that no problem arises in the mechanism. At this time, therefore, the rotational power from the motor 23 is not transmitted to the film spool 12 of the film cartridge 10 via the second gear train GT2 and so on. Further, when subsequently the film is being wound on from one frame to another, in an identical manner the rotational power from the motor 23 is not transmitted to the film spool 12 of the film cartridge 10, so that the film is being pulled along by the rotation of the film take up spool 25, rather than being pushed by the rotation of the film spool 12.

Later, when the motor 23 rotates in its backward rotational direction, this backward rotation is transferred via the first gear train GT1 and the second gear train GT2 to the film cartridge spool drive gear wheel 22a in a manner to rotate it in the backward rotational direction. On the other hand, by the per se conventional action of a planetary gear mechanism not shown in the figures, this backward rotation is not transferred via the first gear train GT1 and the third gear train GT3 to the film take up spool 25, but on the contrary the film take up spool 25 is left to rotate freely. Thereby the film cartridge spool drive member 22 rotates the film spool 12 in the backward rotational direction, and the film 11 is progressively wound back up onto the film spool 12, while the film take up spool 25 is passively turned. Finally the leading end of the film 11 is pulled back through the film passage slit 15, so that the entire film 11 comes to be wound up on the film spool 11 and housed within the film cartridge 10. If more details are required relating to the construction and operation of this film forwarding device, reference should be made to the previously identified Japanese Patent Application No.Heisei 3-330868.

In this preferred embodiment of the present invention, as will be mentioned later with reference to the flow chart relating to its operation, a decision is made as to whether or not the auto loading process that takes place when the film cartridge has been loaded into the camera has proceeded properly. This decision procedure is disclosed in the previously identified U.S. Pat. No. 5,136,314, but nevertheless an outline thereof will be explained hereinafter.

The reference numeral 30 denotes a feeding amount detection roller which is disposed so as to contact with the portion of the film 11 which extends between the film spool 12 of the film cartridge 10 and the film take up spool 25, and which is rotated as the film 11 is fed. On the upper surface in the figure of the roller 30 there is concentrically inscribed an electroconductive pattern 31 in the general form of a toothed wheel. The reference numerals 32a and 32b denote a pair of brushes which are fixed to the frame of the camera, and the one 32a of these brushes always in electrical contact with the pattern 31, while the other 32b of these brushes comes into intermittent contact with the tooth shaped outer peripheral portions of the pattern 31, as the pattern 31 rotates along with the roller 30. In FIG. 2 to be described hereinafter the film feeding amount detection roller 30 and the pattern 31 provided thereon, and the brushes 32a and 32b constitute a film movement detection switch SW4, and as the film 11 is forwarded from the film spool 12 to the film take up spool 25, this film movement detection switch SW4 alternately opens and closes repeatedly at a period corresponding to the speed of forwarding of the film 11.

Further, the reference numeral 40 denotes a rotation detection plate which is rotated together with the shaft 23a of the motor 23, and on the upper surface in the figure of the plate 40 there is concentrically inscribed an electroconductive pattern 41. The reference numerals 42a and 42b denote a pair of brushes which are fixed to the frame of the camera, and the one 42b of these brushes is always in electrical contact with the pattern 41, while the other 42a of these brushes comes into intermittent contact with the pattern 41. In FIG. 2 to be described hereinafter the rotation detection plate 40 and the pattern 41 thereon, and the brushes 42a and 42b constitute a motor rotation detection switch SW5, and as the motor 23 operates, this motor rotation detection switch SW5 alternately opens and closes repeatedly at a period corresponding to the speed of rotation of the motor 23.

As explained previously, the speed of forwarding of the film 11 is substantially higher when the film take up spool 25 has caught the leading end of the film 11 in comparison to its value before the film take up spool 25 has caught the leading end of the film 11, and accordingly the period of opening and closing of the film movement detection switch SW4 is substantially shorter after the film 11 catches on the film take up spool 25 than before. On the other hand, the period of opening and closing of the motor rotation detection switch SW5 is substantially the same after the film 11 catches on the film take up spool 25 as before. Accordingly, it is possible to determine whether or not the film forwarding speed has increased, i.e. whether or not the leading end of the film 11 has properly caught onto the film take up spool 25 so that the operation of film auto loading has been properly completed, by counting the number of falling slopes of the output signal from the motor rotation detection switch SW5 which occur between one falling slope of the output signal from the film movement detection switch SW4 and the next, and testing whether or not, respectively, this counted value is less than some predetermined value. To put it in another manner, if within a previously determined time period it is decided that the leading end of the film 11 has properly caught onto the film take up spool 25 (i.e., within the previously determined time period the speed of forwarding of the film has increased), then it is possible to conclude that the film auto loading process has been completed satisfactorily. While, on the other hand, if within the previously determined time period it is decided that the leading end of the film 11 has not properly caught onto the film take up spool 25 (i.e., within the previously determined time period the speed of forwarding of the film has not increased), then it is possible to conclude that the film auto loading process has not been completed satisfactorily.

FIG. 2 is a block diagram of a control system for this camera according to the first preferred embodiment, which is equipped with the film forwarding device of FIG. 1. The reference numeral 51 denotes a control circuit which incorporates a microcomputer, a memory, a timer and various other ancillary devices, and to this control circuit 51 there are connected various circuits and switches as will now be described.

The reference numeral 52 denotes a motor drive circuit which controls the rotation of the electric motor 23 which is the source of rotational energy for the above described film forwarding device. 53 is a drive circuit which not only drives the above described photoreflective detector 21 for reading out the bar code pattern from the bar code disk member 13, but also serves as a drive circuit for performing amplification and improvement of the waveform of the bar code signal output from the photoreflective detector 21. 54 is a memory which accumulates the bar code signal from the photoreflective detector 21, which outputs stored bar code signal to the control circuit 51 when so required. Further, 57 is an exposure control device which controls a shutter, an iris, etc. of the camera, and which upon orders from the control circuit 51 sets the shutter speed, the aperture, etc., and controls the shutter so as to perform photography.

SW1 is a cartridge loaded switch which is turned ON when a film cartridge 10 is loading into the cartridge receiving chamber of the camera, and is otherwise OFF. SW2 is a film lid closed switch which is turned ON when a lid of the cartridge receiving chamber is properly closed, and is otherwise OFF. SW3 is a release switch which is turned ON when a release button of the camera is depressed, and is otherwise OFF.

SW4 is the above described film movement detection switch which comprises the film feeding amount detection roller 30 and the electroconductive pattern 31 provided thereon, and the brushes 32a and 32b, and its one side is connected to ground while its other side is connected to a counter A which is designated by the reference numeral 55. This counter A counts up by one (increments) every time it detects a falling slope of the output signal from the film movement detection switch SW4, and is connected to the control circuit 51 so that its counted value can be read by the control circuit 51, and so that, further, the counted value of this counter A can be reset to zero upon the receipt of an order from the control circuit 51. SW5 is the above described motor rotation detection switch which comprises the rotation detection plate 40 and the pattern 41 thereon, and the brushes 42a and 42b, and its one side is connected to ground while its other side is connected to a counter B which is designated by the reference numeral 56. This counter B counts up by one (increments) every time it detects a falling slope of the output signal from the motor rotation detection switch SW5, and is connected to the control circuit 51 so that its counted value can be read by the control circuit 51, and so that, further, the counted value of this counter B can be reset to zero upon the receipt of an order from the control circuit 51.

Now the control procedure executed by this control circuit 51 will be described with the aid of the flow chart shown in FIG. 3.

When a battery not shown in the figures is loaded into this camera and activates the operation of the control circuit 51, the execution of this control procedure or program starts. First, in the decision step S1, a decision is made as to whether or not the cartridge loaded switch SW1 is ON. If the result of this decision is YES, i.e. if the cartridge loaded switch SW1 is ON and therefore a film cartridge is currently loaded into the camera, then the flow of control passes next to the decision step S2; while on the other hand, if the result of this decision is NO, i.e. if the cartridge loaded switch SW1 is OFF so that no film cartridge is yet loaded into the camera, then the flow of control loops back to this step S1 again in a tight loop. Similarly, in the next decision step S2, a decision is made as to whether or not the film lid closed switch SW2 is ON. If the result of this decision is YES, i.e. if the film lid closed switch SW2 is ON and therefore the film lid is currently properly closed, then the flow of control passes next to the step S3A; while on the other hand, if the result of this decision is NO, i.e. if the film lid closed switch SW2 is OFF and therefore the film lid is not yet properly closed, then the flow of control loops back to the step S1 again in a tight loop.

If therefore both the cartridge loaded switch SW1 and the film lid closed switch SW2 are ON, the flow of control proceeds to the step S3A, in which the value of a flag DD is set to unity, and next the flow of control proceeds to the step S3. In this step S3, the values of two other flags M and D are both set to zero, and then the flow of control proceeds to the next step S4. The flag M is set to unity when an error has occurred in the film auto loading process —more exactly, when an error has occurred in the leading end of the film 11 catching onto the film take up spool 25—while the flag D is set to unity when it has proved impossible to decipher the bar code signal which has been read in from the photoreflective detector 21 via the drive circuit 53 and the memory 54 during the auto loading process. And the flag DD is set to zero when the bar code signal read in while rewinding the film or thereafter turning the axis of the film spool 12 backward has been properly decoded.

In the next step S4, the auto loading process is performed, and then the flow of control proceeds to the next decision step S5. In detail, in this step S4, the motor 23 is rotated in its forward direction, so that the film spool 12 of the film cartridge 10 is rotated in the forward rotational direction, whereby the leading end of the film 11 is pushed out through the film passage slit 15 of the film cartridge 10 so as to reach the outside and is subsequently further pushed in the same manner along past the aperture 27 of the camera until it reaches and is caught by the film take up spool 25. Subsequently the motor 23 is operated for a predetermined further amount, so as to further advance the film 11 by winding it up onto the film take up spool 25 to a predetermined amount, whereby the portion of the film 11 on which it is suitable to shoot the first film frame is positioned to oppose the aperture 27, ready to be shot. Further, during this auto loading process the photoreflective detector 21 is operated via its drive circuit 53, and thereby the photoreflective detector 21 reads out a bar code signal from the bar code pattern inscribed on the bar code disk member 13 of the film spool 12 of the film cartridge 10. This bar code signal read out by the photoreflective detector 21 is outputed via the drive circuit 53 to the memory 54, in which it is stored.

In the next decision step S5, a decision is made as to whether or not in fact the leading end of the film 11 did properly catch onto the film take up spool 25. If the result of this decision is YES, i.e. if the leading end of the film 11 did properly catch onto the film take up spool 25, then the flow of control passes next to the decision step S5A; while on the other hand, if the result of this decision is NO, i.e. if the leading end of the film 11 did not properly catch onto the film take up spool 25, then the flow of control passes next to the step S14. The decision performed in this decision step S5 is made in the following manner.

From the start of the auto loading process, the abovementioned counters A and B are operating, and the number of falling slopes of the output signal from the motor rotation detection switch SW5 which occur between one falling slope of the output signal from the film movement detection switch SW4 and the next are counted. If within a previously determined time period this number has not dropped below a previously determined constant value, then the decision is made that the leading end of the film 11 did not properly catch onto the film take up spool 25 during the allotted time period therefor, so that it is considered that an error has occurred. While if, on the other hand, within the previously determined time period this number does indeed drop below the previously determined constant value, then the decision is made that the leading end of the film 11 has indeed properly caught onto the film take up spool 25. Such a film auto loading error can occur, for instance, if the leading end of the film 11 is cut or cracked so that it cannot properly be caught onto the film take up spool 25, or if the leading end of the film 11 is bent, folded, or twisted.

If in the decision step S5 it is decided that an error in film auto loading has occurred, the flow of control proceeds next to the step S14. In this step, the value of the flag M is set to unity, and next the flow of control proceeds to the step S13, in which as explained hereinafter the film 11 is rewound. On the other hand, if in the decision step S5 it is decided that the film auto loading operation has been successfully accomplished, then next the flow of control proceeds to the decision step S5A. In this decision step S5A, a decision is made as to whether or not the value of the flag DD is zero. If the result of this decision is YES, i.e. if the value of the flag DD is zero which indicates that the flow of control has passed through the steps S21, S22 and particularly S24 to be described hereinafter and therefore that the bar code signal which has been read in while turning the axis of the film spool 12 backward has been properly decoded, then the flow of control skips to pass next to the decision step S9; while on the other hand, if the result of this decision is NO, i.e. if the value of the flag DD is unity which indicates that the flow of control has not passed through the steps S21, S22 and particularly S24, then the flow of control passes next to the step S6. In this step S6, the bar code signal stored in the memory 54 is input to the control circuit 51, and then the flow of control proceeds to the next step S7, in which this bar code signal is decoded by the control circuit 51. The flow of control next proceeds to the decision step S8, in which a decision is made as to whether or not this decoding operation for the bar code signal has been successful, i.e as to whether or not it has been possible accurately to obtain the information related to this film 11 which was encoded in the bar code inscribed on the bar code disk member 13. If the result of this decision is YES, i.e. if it has been possible accurately to obtain the information related to this film 11, then the flow of control passes next to the decision step S9; while on the other hand, if the result of this decision is NO, i.e. if it has not been possible accurately to obtain the information related to this film 11, then the flow of control passes next to the step S15, in which the value of the flag D is set to unity, and from which the flow of control next proceeds to the step S13.

In this decision step S9, a decision is made as to whether or not the release button (not shown) previously mentioned is being operated. This decision is made according to the output from the release switch SW3. If the result of this decision is YES, i.e. if the release button is being operated, then the flow of control passes next to the step S10; while on the other hand, if the result of this decision is NO, i.e. if the release button is not being operated, then the flow of control loops back in a tight loop to this decision step S9 again. Accordingly, this decision step S9 functions to wait until the release button of the camera is operated.

In the next step S10, the exposure control device 57 is operated, so as to set the shutter speed, the aperture, etc., and so as to control the shutter so as to perform photography; and then the flow of control proceeds to the next decision step S11. In this decision step S11, a decision is made as to whether or not the counted value on a film frame counter not shown in the figures has yet reached the total number of frames to be shot on the film 11 as indicated by the bar code information relating to the film 11 which has been decoded from the bar code signal read out as explained above. If the result of this decision is YES, i.e. if the film frame count has indeed reached the total number of frames to be shot on the film 11, which means that the film has now been finished, then the flow of control passes next to the step S13; while on the other hand, if the result of this decision is NO, i.e. if the film frame count has not yet reached the total number of frames to be shot on the film 11, which means that the film has not yet been finished, then the flow of control passes next to the step S12. In this step S12, the control circuit 51 actuates the motor 23, via the motor drive circuit 52, to operate in its forward rotational direction, so as to wind on the film 11 by just one film frame, and then the flow of control returns back to the decision step S9 again, waiting for the release button of the camera to be operated so as to shoot the next frame on this film 11.

On the other hand, in the step S13, the control circuit 51 actuates the motor 23, via the motor drive circuit 52, to operate in its backward rotational direction, so as to rewind the film 11. During and in parallel with this rewinding operation, the photoreflective detector 21 is also operated via its drive circuit 53, and thereby the photoreflective detector 21 reads out a bar code signal from the bar code pattern inscribed on the bar code disk member 13 of the film spool 12 of the film cartridge 10, and this bar code signal read out by the photoreflective detector 21 is outputed via the drive circuit 53 to the memory 54, in which it is stored. When the rewinding of the film 11 has been completed, the flow of control passes next to the decision step S16. In this decision step S16, a decision is made as to whether or not the value of the flag M is unity. If the result of this decision is YES, i.e. if the value of the flag M is unity, which means that the flow of control has reached this decision step S16 via the step S14 so that the film 11 is not finished but on the contrary during the film auto loading process the problem occurred that the leading end of the film 11 did not properly catch onto the film take up spool 25, then the flow of control returns back to the step S3 again, in order to make another attempt at the auto loading process. While on the other hand, if the result of this decision is NO, i.e. if the value of the flag M is not unity, then the flow of control passes next to the decision step S17.

In this decision step S17, a decision is made as to whether or not the value of the flag D is unity. If the result of this decision is YES, i.e. the value of the flag D is unity, then this means that the flow of control has reached this step via the step S15 and that therefore, although the film auto loading process was accomplished successfully, it was not possible properly to decode the bar code signal which was read in; and then the flow of control passes next to the step S20. On the other hand, if the result of this decision is NO, i.e. if the value of the flag D is not unity, then this means that all the frames on the film 11 have been shot and the film 11 has been finished; and in this case the flow of control passes next to the step S18.

In the step S20 and the following step S21, a process identical to that performed in the previously explained steps S6 and S7 is performed; in other words, the stored bar code signal is input from the memory 54 into the control circuit 51, and then is decoded; and then the flow of control proceeds to the next decision step S22, in which a decision is made as to whether or not this decoding operation for the bar code signal has been successful, i.e as to whether or not it has been possible accurately to obtain the information related to this film 11 which was encoded in the bar code inscribed on the bar code disk member 13. If the result of this decision is YES, i.e. if it has been possible accurately to obtain the information related to this film 11, then the flow of control passes next to the step S24, in which the value of the flag DD is reset to zero, and from which the flow of control next proceeds to loop back to the step S3 again; while on the other hand, if the result of this decision is NO, i.e. if it has not been possible accurately to obtain the information related to this film 11, then the flow of control passes next to the step S23. In this step S23, the motor 23 is again operated in the reverse direction so as to rotate the film spool 12 of the film cartridge 10 in the reverse direction, and the flow of control returns back to the step S20. The flow of control thus loops repeatedly round the steps S20, S21, S22, and S23 until the bar code has been properly read in and decoded, when the flow of control escapes this loop via the step S24 as described above.

Since the bar code signal which is read out from the memory 54 in the step S6 was read out from the bar code disk member 13 by the photoreflective detector 21 while the bar code disk member 13 was being rotated in the forward direction, while on the other hand the bar code signal which is read out from the memory 54 in the step S20 was read out from the bar code disk member 13 by the photoreflective detector 21 while the bar code disk member 13 was being rotated in the backward rotational direction, therefore naturally the decoding processes applied for the bar code signal in the respective following steps S7 and S21 must be different. The details of this matter are per se easily supplemented by a person of ordinary skill in the bar code decoding art based upon the disclosure in this specification, and therefore details thereof will be omitted in the interests of brevity.

When on the other hand in the decision step S17 it is found that the value of the flag DD is not unity, then it is considered that the step S13 was reached after all of the frames available on the film had been shot, i.e. that the step S13 was reached via the YES branch from the decision step S11, and therefore the flow of control is transferred to the decision step S18, in which a decision is made as to whether or not the film lid closed switch SW2 is OFF. If the result of this decision is NO, i.e. if the film lid closed switch SW2 is ON and therefore the film lid is currently closed, then the flow of control loops back to this step S18 again in a tight loop; while on the other hand, if the result of this decision is YES, i.e. if the film lid closed switch SW2 is OFF and therefore the film lid is not currently closed, then the flow of control passes next to the decision step S19, in which, similarly, a decision is made as to whether or not the cartridge loaded switch SW1 is OFF. If the result of this decision is NO, i.e. if the cartridge loaded switch SW1 is ON and therefore a film cartridge is currently loaded into the camera, then the flow of control loops back to the previous step S18 again in a tight loop; while on the other hand, if the result of this decision is YES, i.e. if the cartridge loaded switch SW1 is OFF so that no film cartridge is currently loaded into the camera, then the flow of control returns back to the initial decision step S1 of this program. This pair of steps S18 and S19 therefore has the effect of waiting until both the film door is open and the film cartridge 10 is removed from the film cartridge chamber of the camera, and only then does the flow of control return to the step S1.

According to the above described procedure, if it proves impossible accurately to decode the bar code signal read in during the film auto loading process, then the film 11 is rewound so as to pull it back into the film cartridge 10, and while this film rewinding is taking place another attempt is made at reading the bar code signal and decoding it. If the bar code signal is accurately read and decoded this time, then the film auto loading process is performed again, so as to bring the camera into readiness for shooting the first film frame. If on the other hand as before the bar code signal cannot accurately be deciphered, then after rewinding the film 11 completely the film spool 12 is further rotated in the backward rotational direction, and further attempts are made at reading the bar code and decoding it. It should be noted that at this time the film 11 merely turns round and round in the film cartridge 10 without causing any problem. When, finally, the operation of decoding the bar code signal has taken place correctly, then the film auto loading process is again performed. Accordingly, even if after the first attempt at auto loading of the film it proves impossible accurately to decode the bar code signal, nevertheless subsequently it is possible to reread and decode the bar code signal, and therefore it is positively ensured that photography is only performed when the information relating to the film encoded in the bar code on the bar code disk member 13 has been accurately read into the camera.

Figure 4:
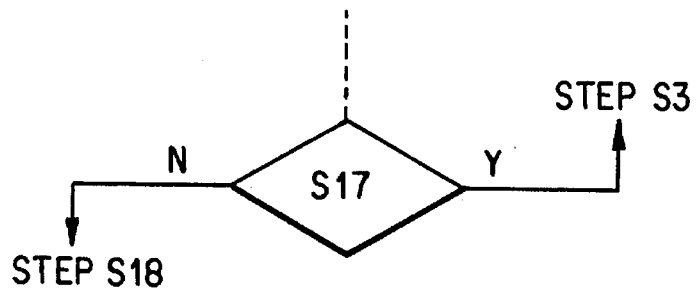
FIG. 4 is a partial flow chart showing a variation upon the FIG. 3 flow chart for the first preferred embodiment.

In the above procedure, when it proves impossible accurately to decode the bar code signal read in during the film auto loading process, then the bar code signal obtained afterwards while the film is being rewound is again decoded; but this is only given as an example of one aspect of the present invention, and is not to be construed as limitative of the present invention. As an alternative, it would also be acceptable according to the principle of the present invention for the film to be temporarily rewound without inputting the bar code signal at that time, and for another attempt at inputting and decoding the bar code signal to be performed while the film was being again subjected to the auto loading process. FIG. 4 is a partial flow chart showing a variation upon the FIG. 3 embodiment, which operates in this manner. For this modification, it suffices to alter the FIG. 3 flow chart so that the YES branch from the decision step S17 returns to the step S3. The steps S20 through S24 can then be truncated from the flow chart. The details of the operation of this variant embodiment can easily be supplemented by a person of ordinary skill in the relevant art based upon the disclosure in this specification, and therefore details thereof will be omitted in the interests of brevity. In this variant embodiment, by contrast to the FIG. 3 embodiment, since the bar code signal which is read out from the memory 54 is always read out from the bar code disk member 13 by the photo-reflective detector 21 while the bar code disk member 13 is being rotated in the forward direction and never while the bar code disk member 13 is being rotated in the backward direction, therefore the decoding process applied for the bar code signal is always the same.

Figure 5:
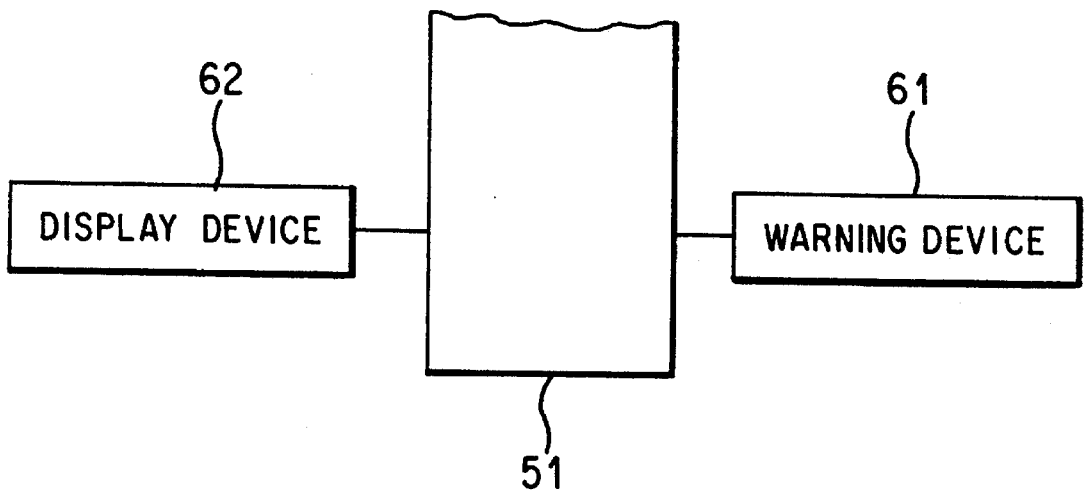
FIG. 5 is a partial block diagram showing a variation upon the FIG. 2 block diagram for the first preferred embodiment.
Figure 6:
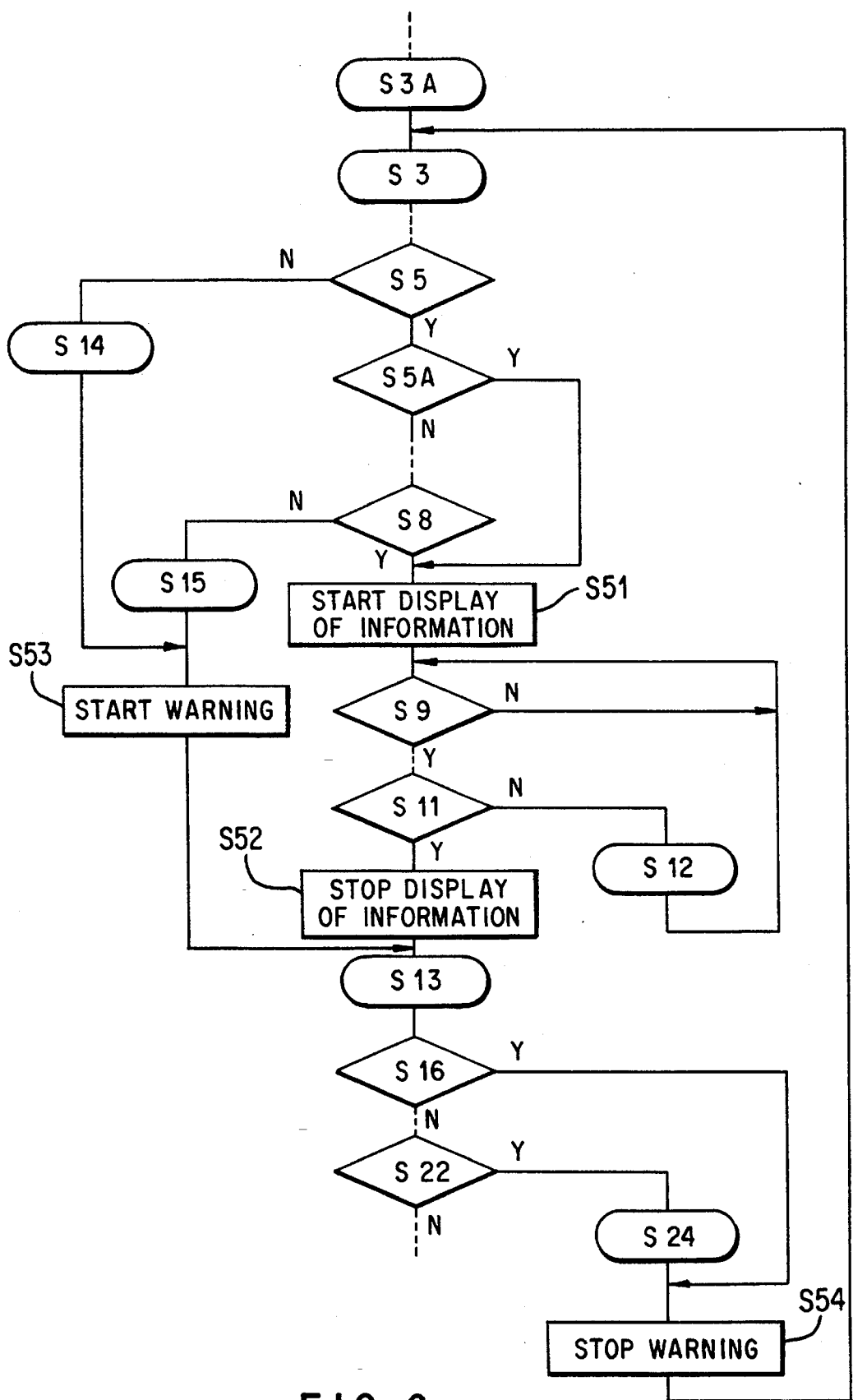
FIG. 6 is a partial flow chart showing a corresponding variation upon the FIG. 3 flow chart for the first preferred embodiment.

In FIGS. 5 and 6, respectively, a partial block diagram and a partial flow chart are shown for another variant of the first preferred embodiment of the present invention. In this variant embodiment, the decoded information relating to the film is displayed to the user of the camera, and if this information cannot be displayed a warning is provided to that effect.

In the FIG. 5 block diagram, the parts in this variant embodiment which are additional to the parts in the FIG. 2 block diagram are shown. The reference numeral 61 denotes a warning device which is for giving a warning to the user of the camera, and may for example be a flashing LED or a buzzer or the like for emitting an audible warning. Further, the reference numeral 62 denotes a display device, which may incorporate a LCD panel type display or the like, for displaying the decoded information relating to the film to the user of the camera. Both of these devices 61 and 62 are connected to the control circuit 51.

FIG. 6 shows how certain program steps S51 through S54 relating to the operation of the devices 61 and 62 can be added to the FIG. 3 flow chart. In detail, when in the step S5A the control circuit 51 decides that the value of the flag DD is zero, or when in the step S8 it is deemed that the decoding process for the bar code signal has been successful, then before control passes to the decision step S9 it first is passed through a new step S51, in which the decoded information relating to the film is displayed on the liquid crystal type display panel or the like of the display 62. After this, when it is decided in the step that all the available frames on the film have been shot, in other words upon a YES decision, a new step S52 is interposed, in which this display of the decoded information is stopped. Further, after the step S14 and also after the step S15, before the step S13 is reached, a new step S53 is interposed, in which the control circuit 51 controls the warning device 61 to start providing a warning to the user of the camera which signifies that the bar code signal which has been read in cannot be decoded. Yet further, after the YES branch from the step S16 and also after the step S24, before the flow of control is transferred back to the step S3, a new step S54 is interposed, in which the control circuit 51 controls the warning device 61 to stop providing this warning. After this, the flow goes to the step S5 via the step S3 and if it is judged in the step S5 that the error in film auto loading process has occurred, the flow goes to the step S53 via the step S14, in which the warning starts. Thereafter, if the flag M is judged to be unity, the flow goes to the step S54. In the step S54, the warning is finished.

Accordingly, warning is provided to the user by the warning device 61 when the bar code signal which has been read in cannot be decoded. A detailed explanation of the functioning of this variant embodiment will easily be supplemented by a person of ordinary skill in the relevant art based upon the disclosure in this specification, and therefore details thereof will be omitted in the interests of brevity.

Preferred Embodiment 2

The second preferred embodiment of the present invention will now be described with reference to the flow chart for its operation shown in FIG. 7 and continued in FIG. 8.

In the above described first preferred embodiment, the film was rewound in the backward rotational direction when it first proved impossible to decode the bar code signal which was read in during the auto loading process, even if the auto loading process itself had been completed satisfactorily, and further attempts to read the bar code signal were made during this backward winding of the film; but, in contrast, the second preferred embodiment shows the case in which the bar code signal is read in while the film is being wound on in the forward direction.

Figure 7:
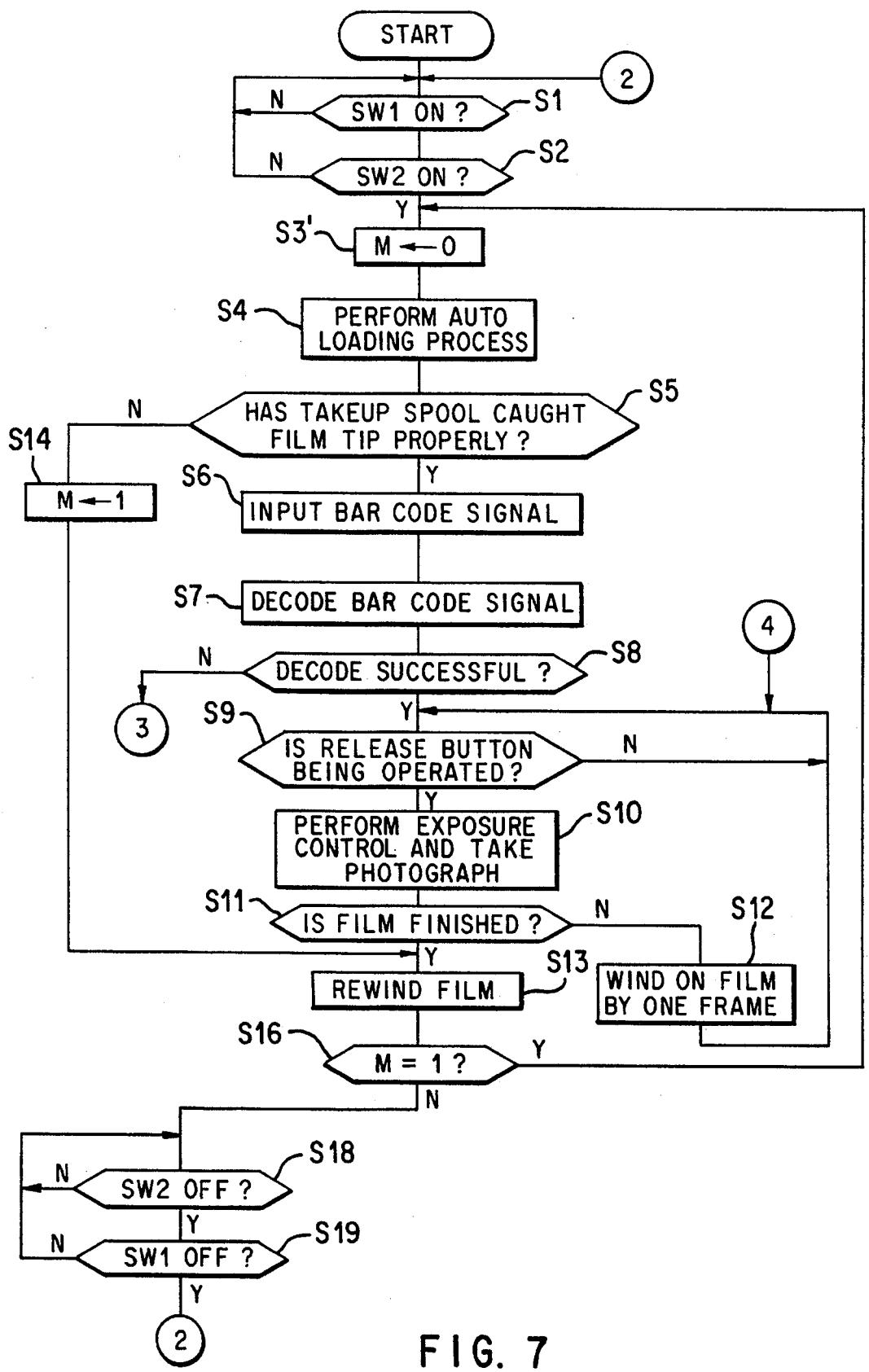
FIG. 7 is a flow chart for explanation of the operation of the second preferred embodiment of the present invention.
Figure 8:
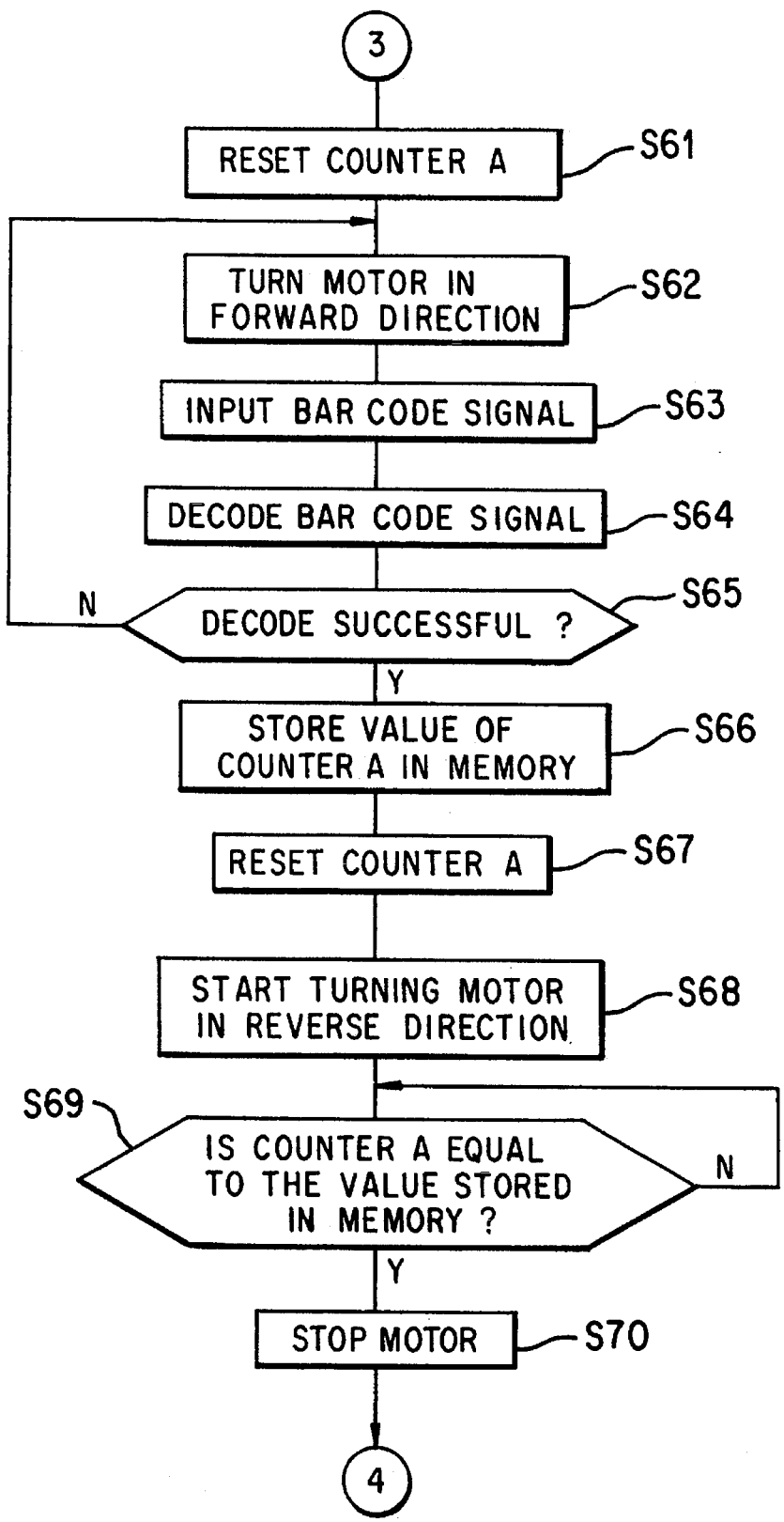
FIG. 8 is a flow chart continuing on from FIG. 7.

FIG. 7 together with its continuation in FIG. 8 constitute a flow chart corresponding to FIG. 3. Explanation of this flow chart will be concentrated on the points in which it differs from the FIG. 3 flow chart, and repetition of concepts which are identical will be avoided.

In this second preferred embodiment, no flags such as the flags D and DD of the first preferred embodiment are used. Accordingly, the steps S3A and S3 of FIG. 3 are replaced by a step S3', and the steps S5A and S15 are eliminated. The steps S17 and S20 through S24 are also eliminated, and when a NO decision is reached in the decision step S16 the flow of control is transferred to the step S18. Further, when in the step S8 it is decided that it has been impossible to decode the bar code signal, the flow of control is transferred to the step S61 of FIG. 8.

Referring to FIG. 8, in the step S61 the above described counter A is reset, and then the flow of control passes next to the step S62. In this step S62, the motor 23 is rotated in the forward direction so as to wind on the film, and simultaneously with this the photoreflective detector 21 is operated so as to read in the bar code signal from the bar code disk member 13 of the film cartridge 10 and store it in the memory 54; and then the flow of control proceeds to the next step S63. In this step S63, the bar code signal which has thus been stored in the memory 54 is input into the control circuit 51, and then the flow of control proceeds to the next step S64, in which the input bar code signal is decoded. In the next decision step S65, a decision is made as to whether or not the bar code signal has been successfully decoded. If the result of this decision is YES, i.e. if the bar code signal has been successfully decoded, then the flow of control proceeds to the step S66; while on the other hand, if the result of this decision is NO, i.e. if the bar code signal has not been successfully decoded, then the flow of control returns back to the step S62 again, to loop around. In the step S66, the value counted on the counter A is stored in the memory of the control circuit 51, and then the flow of control proceeds to the next step S67. In this step S67, the value of the counter A is reset to zero, and then the flow of control proceeds to the next step S68. In this step S68, the motor 23 is rotated in the backward direction so as to start winding back the film; and then the flow of control proceeds to the next decision step S69. In this decision step S69, a decision is made as to whether or not the counted value on the counter A has yet become equal to the value previously stored in the memory of the control circuit 51 in the step S66. If the result of this decision is YES, i.e. if the value of the counter A is now equal to the previously stored value, which means that the film has now been rewound back to the position that it was in at the step S61, then the flow of control passes next to the step S70; while on the other hand, if the result of this decision is NO, i.e. if the value of the counter A is not yet equal to the previously stored value, which means that the film requires to be further wound back, then the flow of control loops back to this decision step S69 in a tight loop. Finally, when the film has thus been rewound to its original position after the bar code signal has been satisfactorily decoded in the step S64, in the step S70 the reverse rotation of the motor 23 is stopped, and the flow of control returns to the step S9 of FIG. 7.

According to the above described second preferred embodiment of the present invention, if it proves impossible accurately to decode the bar code signal read in during the film auto loading process, then as the film is wound forward the bar code signal is read in and decoded, repeatedly if necessary, and when this decoding process has been executed satisfactorily the film is rewound back to its position which it attained at the end of the auto loading process, in other words to its position in which its portion on which it is suitable to shoot the first film frame is positioned directly opposite the aperture 27 of the camera. However, this is not to be considered as being limitative of the present invention. When the decoding process has been executed satisfactorily, the film may rewind back to its position other than the position which it attained at the end of the auto loading process.

It would also be acceptable, as an alternative, to dispense with the film rewinding operation, and to merely continue with photography from the point on the film in the film winding on process that was reached when it was possible to read and decode the bar code signal accurately.

Although in the shown preferred embodiments of the present invention the bar code signal was read in during the auto loading process, this is only exemplary, and is not to be considered as limitative of the present invention. The present invention may be applied to a camera of the type in which photography is commenced from when the film initially stored within the cartridge has entirely pre-wound on the film take up spool. With this camera, the bar code signal is read in during the prewinding process and afterward decoding it, and the film is rewound and another attempt is made when an error has occurred in the decoding process.

The construction of the bar code pattern reading in mechanism and of the film forwarding mechanism should not be considered as limited to those shown in the figures. For example, the principle of the present invention could also be applied to a camera incorporating a film forwarding mechanism in which two separate motors were used, one for rotating the film spool in the film cartridge, and the other for rotating the take up spool. Further, the information relating to the film which is inscribed as a bar code pattern on the bar code disk member or the like is not to be considered as being limited to the ISO sensitivity of the film or the number of frames available on the film, since other possibilities are also available within the scope of the present invention: for example, information related to the production of the film or the like, such as latitude information or film serial number of production or date of film production or the like, could also be made available in this bar coded form. The present invention is also applicable to a camera in which, after the film has been loaded into the camera, the auto loading process is only performed upon a specific command being issued by the user of the camera, i.e. is only performed according to the will of the camera user. Other variations are also possible.

I claim:

1. A camera, for shooting a film wound on a rotatable film spool located in a film cartridge which is loaded into said camera and which further comprises a bar code bearing element rotating together with said film spool, said camera comprising:

(a) a film spool rotating means which by rotating said film spool in a forward rotational direction projects a leading end of said film out from said film cartridge towards and against a film take up spool, and also, by rotating said film spool in a backward rotational direction, winds said film back into said film cartridge;

(b) a film winding on means which winds on said film by rotating said film take up spool in a forward rotational direction;

(c) a bar code reading out means which, when said film spool of said film cartridge is rotating, reads the pattern of a bar code which is provided on said bar code bearing element and outputs a bar code signal; and (d) a control means which deciphers said bar code signal and decides whether or not decipherment of said read out bar code signal proved possible;

said control means causing said film spool rotating means to rotate said film spool in said backward rotational direction if a decision is made that decipherment of said read out bar code signal did not prove possible.

2. An apparatus capable of moving a film wound on a rotatable film spool located in a film cartridge that is loaded into said apparatus, the film spool including a bar code bearing element that rotates together with said film spool, said apparatus comprising:

(a) a film spool rotating mechanism that selectively rotates the film spool in a forward rotational direction to project a leading end of the film out from the film cartridge towards and against a film take up spool, and in a backward rotational direction to wind the film back into the film cartridge;

(b) a film winding mechanism that winds the film around the film take up spool by rotating said film take up spool in a forward rotational direction;

(c) a bar code reading device that reads the pattern of a bar code provided on the bar code bearing element and outputs a bar code signal when the film spool of the film cartridge is rotating; and (d) a controller adapted to determine whether said bar code signal can be deciphered, and to control said film spool rotating mechanism to rotate the film spool in said backward rotational direction when said bar code signal cannot be deciphered, said controller being coupled to said film spool rotating mechanism, said film winding mechanism, and to said bar code reading device.

3. An apparatus according to claim 2, wherein said controller performs an auto loading operation in which said controller causes said film spool rotating mechanism to project the leading end of said film out from said film cartridge by rotating said film spool in said forward rotational direction to catch said film;

and wherein said controller performs said auto loading operation when said film cartridge is loaded into said apparatus, and further operates said bar code reading device during the auto loading operation.

4. An apparatus according to claim 3, wherein said controller, when said controller has proved impossible to decipher the bar code signal read out during said auto loading operation, controls said film spool rotating mechanism, said film winding mechanism, and said bar code reading device, so as, after the rewinding process is completed, to perform said auto loading operation for a second time, and simultaneously during said second auto loading operation, to read out said bar code pattern and decipher the read out bar code signal.

5. An apparatus according to claim 2, wherein said controller, when said controller has proved impossible to decipher said read out bar code signal, controls said bar code reading device to read out said bar code pattern simultaneously with rewinding said film into said film cartridge by rotating said film spool in said backward rotational direction by said film spool rotating mechanism.

6. An apparatus according to claim 5, wherein said controller performs an auto loading operation in which said controller causes said film spool rotating mechanism to project the leading end of said film out from said film cartridge by rotating said film spool in said forward rotational direction and causes said film take up spool to catch said film;

and wherein said controller performs said auto loading operation when said film cartridge is loaded into said apparatus, operates said bar code reading device during the auto loading operation, and also performs said auto loading operation when said bar code signal which is read out during the operation of rewinding said film into said film cartridge can be accurately deciphered.

7. An apparatus according to claim 5, wherein said controller, when said controller has proved impossible to decipher said bar code signal read out during rewinding of the film, controls said film spool rotating mechanism and said bar code reading device so as, after the rewinding process is completed, further to rotate said film spool in said backward rotational direction, simultaneously reading out said bar code pattern and deciphering the read out bar code signal.

8. An apparatus according to claim 7, wherein said controller performs an auto loading operation in which said controller causes said film spool rotating mechanism to project the leading end of said film out from said film cartridge by rotating said film spool in said forward rotational direction and causes said film take up spool to catch said film;

and wherein said controller performs said auto loading operation when said film cartridge is loaded into said apparatus, operates said bar code reading device during the auto loading operation, and also performs said auto loading operation when said bar code signal which is read out while further rotating said film spool in said backward rotational direction can be accurately deciphered.

9. An apparatus according to claim 6, wherein said controller prevents a subsequent operation of said apparatus when said controller has proved impossible to decipher said bar code signal.

10. An apparatus according to claim 2, further comprising an indicating device which, when said controller has proved possible to decipher said bar code signal, indicates the deciphered information therein to the user of the apparatus.

11. An apparatus according to claim 2, further comprising a warning device which, when said controller has proved impossible to decipher said bar code signal, gives a warning to this effect to the user of the apparatus.

12. An apparatus according to claim 11, wherein the operation of said warning device is stopped when said controller proves possible to decipher said bar code signal.

13. An apparatus according to claim 2, wherein said controller is further adapted to control said bar code reading device to read the pattern of the bar code provided on the bar code bearing element and to output a second bar code signal when said film spool rotating mechanism rotates the film spool in said backward rotational direction, after said controller determines that the bar code signal cannot be deciphered.

14. An apparatus according to claim 2, wherein said controller is further adapted to control said film spool rotating mechanism to rotate the film spool in said forward rotational direction a second time after said film spool rotating mechanism rotates said film spool in said backward direction, said controller also adapted to control said bar code reading device to read the pattern of the bar code provided on the bar code bearing element and to output a second bar code signal when said film spool rotating mechanism is rotating the film spool in said forward rotational direction said second time.

15. A camera, for shooting a film wound on a rotatable film spool located in a film cartridge which is loaded into said camera and which further comprises a bar code bearing element rotating together with said film spool, said camera comprising:

(a) a film spool rotating means which by rotating said film spool in a forward rotational direction projects a leading end of said film out from said film cartridge towards and against a film take up spool, and also, by rotating said film spool in a backward rotational direction, winds said film back into said film cartridge;

(b) a film winding on means which winds on said film by rotating said film take up spool in a forward rotational direction;

(c) a bar code reading out means which, when said film spool of said film cartridge is rotating, reads the pattern of a bar code which is provided on said bar code bearing element and outputs a bar code signal; and (d) control means which performs an auto loading operation in which said control means causes said film spool rotating means to project the leading end of said film out from said film cartridge by rotating said film spool in said forward rotational direction, and controls said film winding on means so that said film take up spool catches said film, said control means causing said bar code reading out means to read out said bar code pattern during said auto loading operation and output a bar code signal deciding whether or not said film has properly been caught onto said film take up spool by said auto loading operation, deciphering said bar code signal when said film has properly been caught onto said film take up spool, and controlling said film spool rotating mean to rewind said film into said film cartridge when decipherment of said read out bar code signal has proved to be impossible.

16. A camera, for shooting a film wound on a rotatable film spool located in a film cartridge which is loaded into said camera and which further comprises a bar code bearing element rotating together with said film spool, said camera comprising:

(a) a film spool rotating means which by rotating said film spool in a forward rotational direction projects a leading end of said film out from said film cartridge towards and against a film take up spool, and also, by rotating said film spool in a backward rotational direction, winds said film back into said film cartridge;

(b) a film winding on means which winds on said film by rotating said film take up spool in a forward rotational direction;

(c) a bar code reading out means which, when said film spool of said film cartridge is rotating, reads the pattern of a bar code which is provided on said bar code bearing element and outputs a bar code signal; and (d) a control means which deciphers said bar code signal, performs an auto loading operation in which said control means causes said film spool rotating means to project the leading end of said film out from said film cartridge by rotating said film spool in said forward rotational direction and causes said film take up spool to catch said film, and controls said film spool rotating means and said bar code reading out means so as: at least to read out said bar code pattern during said auto loading operation; to decide whether or not decipherment of said read out bar code signal proved possible; and, if a decision is made that decipherment of said read out bar code signal did not prove possible, while winding said film further on by further rotating said take up spool in said forward rotational direction, to again read out said bar code pattern, and to again attempt to decipher said read out bar code signal.

17. An apparatus capable of moving a film wound on a rotatable film spool located in a film cartridge that is loaded into said apparatus, the film spool including a bar code bearing element that rotates together with said film spool, said apparatus comprising:

(a) a film spool rotating mechanism that selectively rotates the film spool in a forward rotational direction to project a leading end of the film out from the film cartridge towards and against a film take up spool, and in a backward rotational direction to wind the film back into the film cartridge;

(b) a film winding mechanism that winds the film around the film take up spool by rotating said film take up spool in a forward rotational direction;

(c) a bar code reading device that reads the pattern of a bar code provided on the bar code bearing element and outputs a bar code signal when the film spool of the film cartridge is rotating; and (d) a controller coupled to said film spool rotating mechanism, said film winding mechanism, and to said bar code reading device, said controller being adapted to:
 (i) control the film spool winding mechanism to perform an auto loading operation in which said controller causes said film spool rotating mechanism to project the leading end of the film out from the film cartridge by rotating the film spool in said forward rotational direction until said film take up spool catches the film,
 (ii) control the bar code reading device to read the pattern of the bar code provided on the bar code bearing element during the auto loading operation and to output the bar code signal,
 (iii) determine whether said bar code signal can be deciphered, and
 (iv) control said film spool rotating mechanism to rotate the film spool further in said forward rotational direction when said bar code signal cannot be deciphered.

18. An apparatus according to claim 17, wherein said controller controls said film spool rotating mechanism and said film winding mechanism so as to stop the winding on of said film when during the further winding on of said film said controller has proved possible accurately to decipher said bar code signal, and so as subsequently to rewind said film back to a position in which a predetermined portion is opposed to a focusing lens of said apparatus.

19. An apparatus according to claim 17, further comprising a decision making device which decides whether or not said film has properly been caught onto said film take up spool through said auto loading operation; and wherein said controller reads out said bar code pattern during said auto loading operation, and, when said decision making device decides that said film has properly caught onto said film take up spool, said controller deciphers said read out bar code signal.

20. An apparatus according to claim 17, further comprising an indicating device which, when said controller has proved possible to decipher said bar code signal, indicates the deciphered information therein to the user of the apparatus.

21. An apparatus according to claim 17, further comprising a warning device which, when said controller has proved impossible to decipher said bar code signal, gives a warning to this effect to the user of the apparatus.

22. An apparatus according to claim 21, wherein the operation of said warning device is stopped when said controller proves possible to decipher said bar code signal.

23. An apparatus according to claim 17, wherein said controller prevents a subsequent operation of said apparatus when said controller has proved impossible to decipher said bar code signal.

24. A controlling method of a camera, for shooting a film wound on a rotatable film spool located in a film cartridge which is loaded into said camera and which further comprises a bar code bearing element rotating together with said film spool, comprising the steps of:

(a) rotating said film spool in a forward rotational direction to project a leading end of said film out from said film cartridge towards a film take up spool;

(b) reading the pattern of a bar code which is provided on said bar code bearing element and outputting a bar code signal while said film spool is rotating in said forward rotational direction;

(c) deciphering said bar code signal;

(d) deciding whether or not decipherment of said read out bar code signal proved possible; and (e) rotating said film spool in said backward rotational direction to rewind said film into said film cartridge, if said decision is made that decipherment of said read out bar code signal did not prove possible.

25. A controlling method of a camera, for shooting a film wound on a rotatable film spool located in a film cartridge which is loaded into said camera and which further comprises a bar code bearing element rotating together with said film spool, comprising the steps of:

(a) rotating said film spool in a forward rotational direction to project a leading end of said film out from said film cartridge towards a film take up spool;

(b) reading out the pattern of a bar code which is provided on said bar code bearing element and outputting a bar code signal while rotating said film spool in said forward rotational direction;

(c) deciphering said bar code signal;

(d) deciding whether or not decipherment of said bar code signal proved possible;

(e) further rotating said film spool in said forward rotational direction, if said decision is made that decipherment of said read out bar code signal did not prove possible; and (f) further reading out the pattern of said bar code during said further rotating of said film spool.

* * * * *